Sept. 30, 1930.   H. KRAUSE   1,776,860
AGRICULTURAL IMPLEMENT
Filed July 27, 1927   3 Sheets-Sheet 1
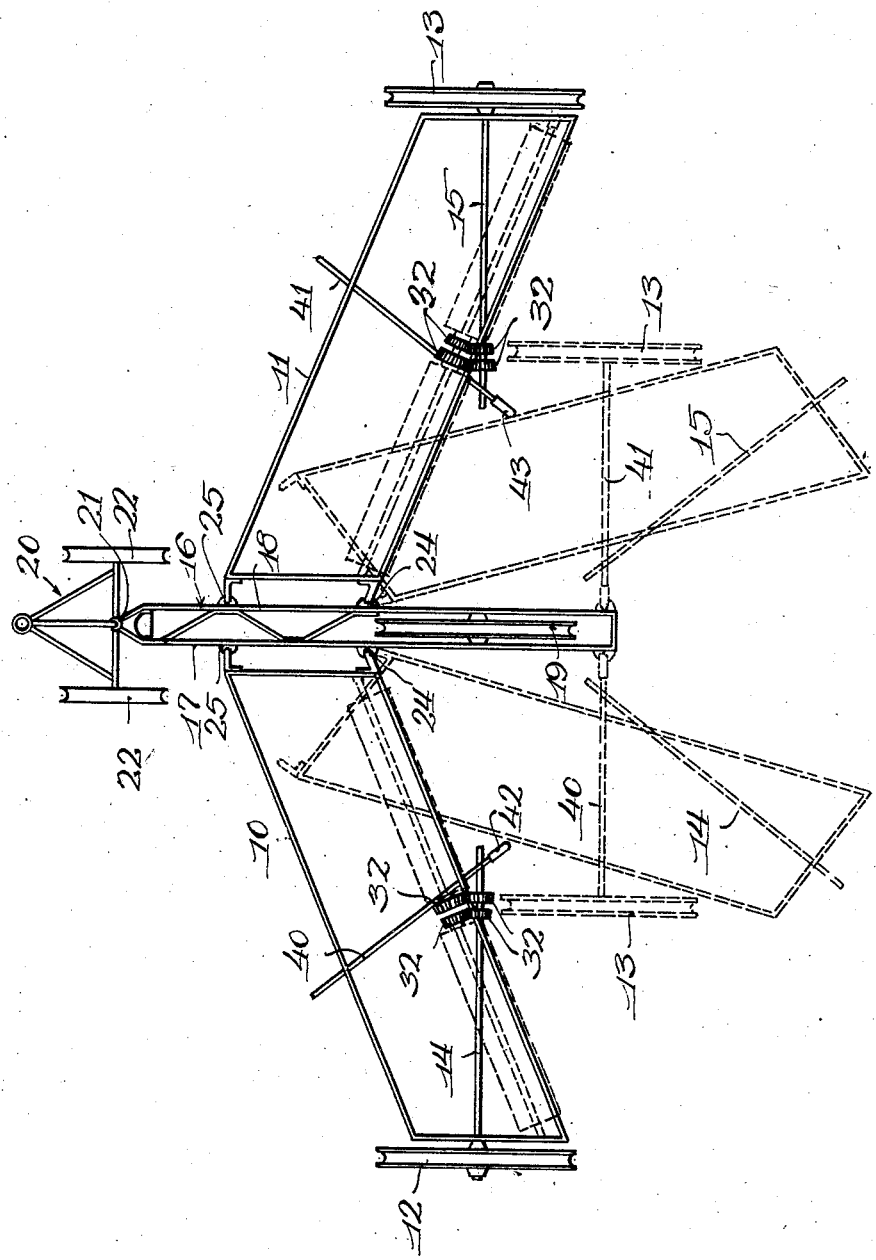

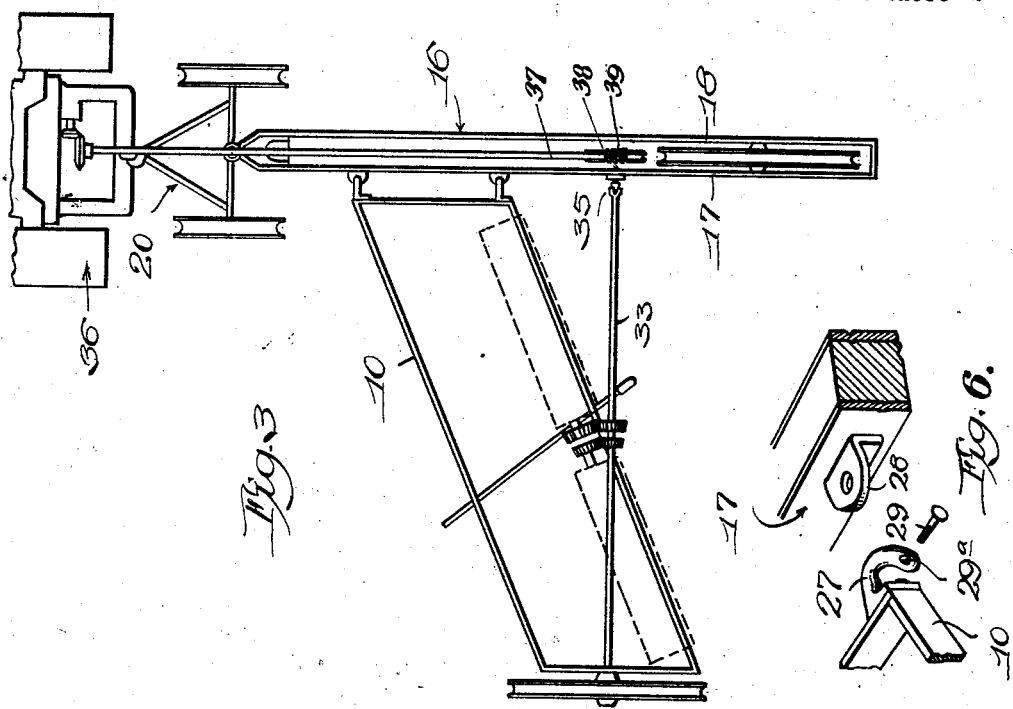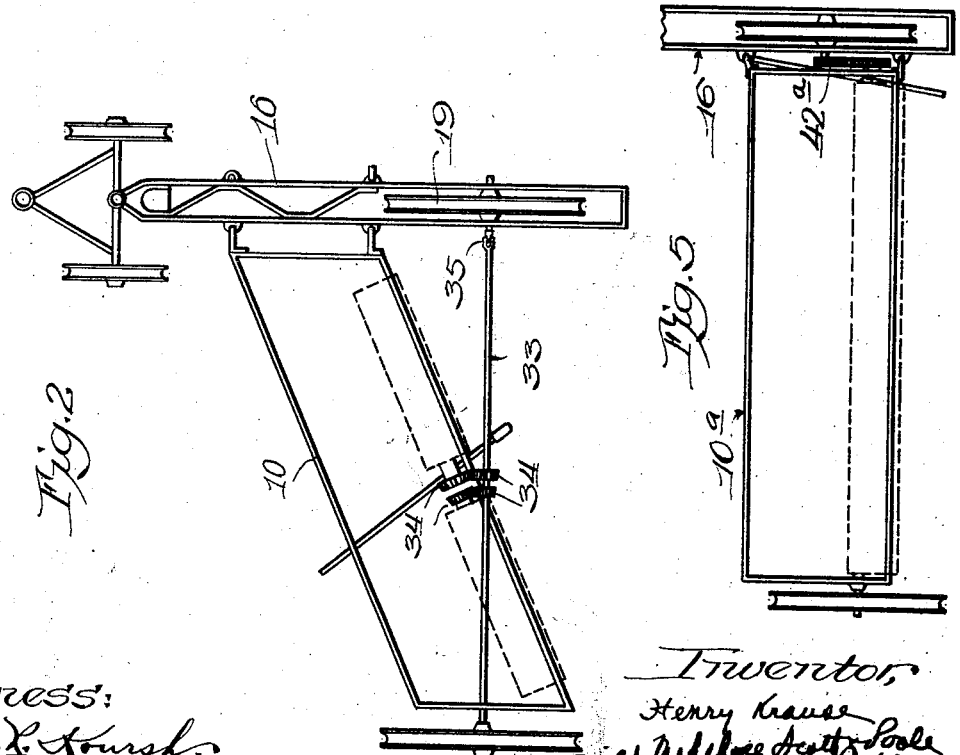

Sept. 30, 1930.  H. KRAUSE  1,776,860
AGRICULTURAL IMPLEMENT
Filed July 27, 1927   3 Sheets-Sheet 3
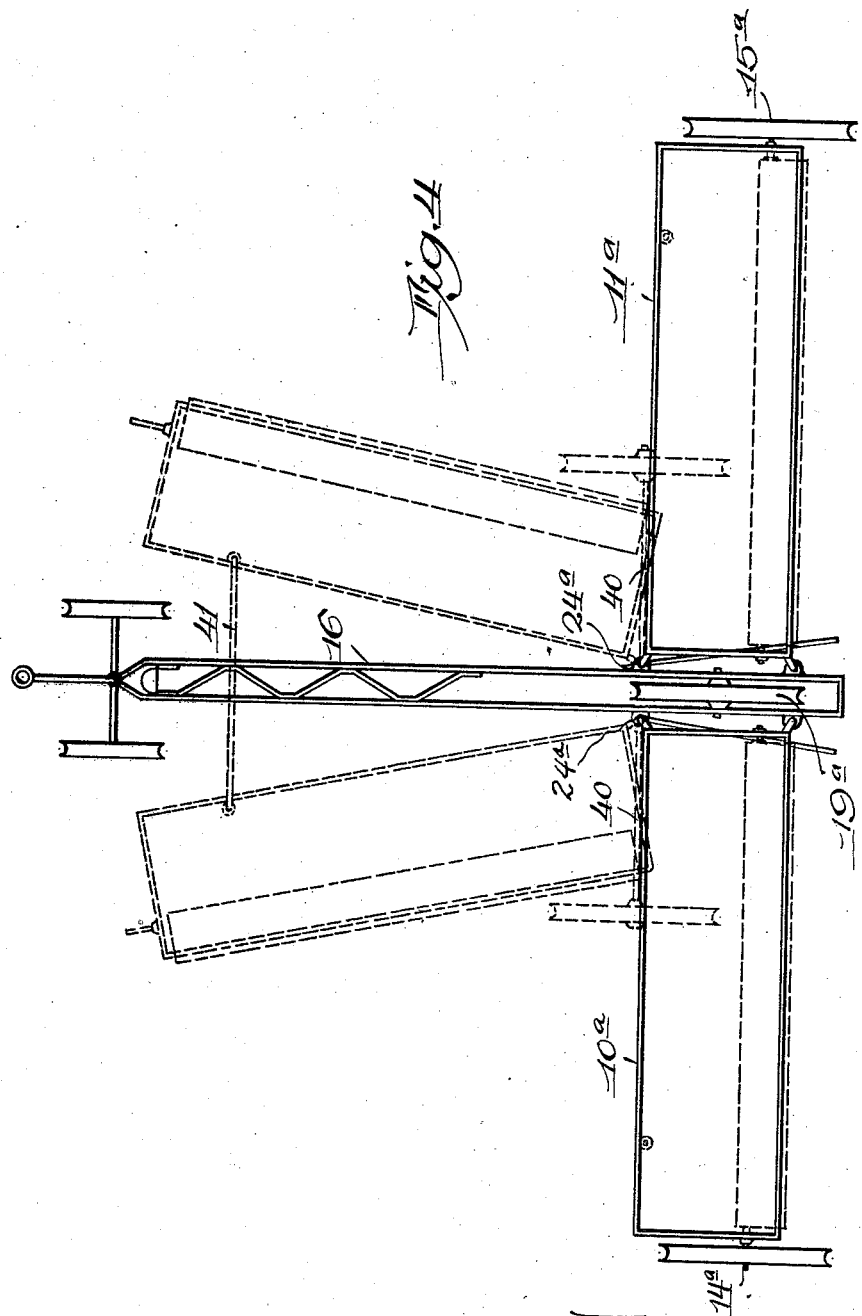

Patented Sept. 30, 1930

1,776,860

UNITED STATES PATENT OFFICE

HENRY KRAUSE, OF MEADE, KANSAS

AGRICULTURAL IMPLEMENT

Application filed July 27, 1927. Serial No. 208,691.

This invention relates to improvements in multiple unit agricultural implements and more particularly to multiple unit drills or automatic seeding devices, although it may also be applied to other types of agricultural implements, as will further appear.

The principal object of the invention is to provide an improved construction and arrangement of a hitch and connecting means for a pair of separate drill units, such as now manufactured for use as a single unit, whereby two of such units may be connected to a central carriage and hitch in order to cover a double width area, but in which the drill units may be folded or collapsed with respect to the central carriage so as to permit the entire apparatus to be readily transported over relatively narrow roadways or the like.

More specifically my invention broadly consists in providing a central carriage including the main hitch, and connecting separate frame units to opposite sides of this carriage in such a manner as to permit the frame units to be folded toward the sides of the carriage, said frame units having interchangeable supporting wheels and auxiliary axles so as to support the wheels in either full extended position or in collapsed or folded position of the frames.

The invention may best be understood by reference to the following drawing, in which Figure 1 is a plan view showing the frame work of an agricultural implement constructed in accordance with my invention, showing the two frame units in extended position in full lines and in collapsed or folded position in dotted lines.

Figures 2 and 3 are fragmentary plan views showing alternative drive connections for the automatic seeding devices, Figure 4 is a plan view showing a modified form of the invention, in which the frame units fold forwardly, Figure 5 is a fragmentary view of the arrangement shown in Figure 4, but with an alternative form of feed driving connections, Figure 6 is a detail view of the hinged connections between the frame and carriage sections.

Referring now more particularly to details of the invention shown in the drawings, I have indicated generally two separate frames 10 and 11 such as may support a series of automatic seeding devices, commonly termed drills, or any other suitable agricultural devices. It will be understood that automatic drills and the like are usually manufactured as separate units, having ground supporting wheels at opposite ends thereof and with suitable hitches in front. The frames 10 and 11 may each be similar to separate drill units such as above described, excepting that the outer ground wheels 12 and 13 and their shafts 14 and 15 are placed at a slight angle to the main frames 10 and 11 respectively, and the ground wheels at the inner ends of said frames are omitted, since the said inner ends are connected directly to a central frame member or carriage 16. This carriage may be of any suitable construction to afford center support for the frame units 10 and 11, and herein consists of two longitudinally side frame members 17 and 18, a center ground supporting wheel 19 herein including a truck indicated generally at 20, pivotally mounted at the forward end of the frame at 21 and having a pair of spaced ground wheels 22, 22.

Draft is applied to the truck 20 by any suitable means such as the evener bar of a team hitch or the draw bar of a tractor (see Figure 3).

Connection between each of the frame members 10 and 11 to the center carriage 16 includes a hinged connection 24 and a detachable connection 25. These connections both permit vertical pivotal movement of the frame member relative to the carriage so that the entire device may readily follow uneven ground, as is especially desirable in wide tread devices of this character.

In the form shown in detail in Figure 6, the hinged connection 24 and the detachable connection 25 both comprise a hook 27 passing through eye 28 attached to the side frame members 17 and 18, but in the case of the detachable member 25, a removable pin 29 is provided in hole 29$^a$ to engage the under side of the eye 28 when in place.

When automatic seed devices or the like are indicated between frames 10 and 11, suitable driving connections for the moving parts may be provided in any suitable manner, as for instance, as shown in Figure 1, the shafts 14 and 15 of the ground wheels 12 and 13 at opposite ends of the frame members, have geared connections 32, 32, to the operating parts (not shown) in the usual manner. Gearing connection may also be afforded through the central ground wheel 19 as shown in the modified form in Figure 2, in which a shaft 33 carried by the center ground wheel is connected to gears 34, 34, through flexible detachable connection 35.

In the modified form shown in Figure 3, power to shaft 33 is derived from tractor 36, through shaft 37, worm 38 and worm gear 39 carrying detachable connections 35, 35, as shown.

When it is desired to fold or collapse the frame members 10 and 11 the connections 25, 25, are disconnected by removing the pins 29, 29, and the frame members 10 and 11 may then be folded rearwardly of the sides of the center carriage 16, as shown in Figure 1.

In the preferred form shown, the frame members 10 and 11 are provided with auxiliary shafts 40, 41 respectively, arranged so that their inner ends have carry fittings 42, 43, which are detachably connectable adjacent the rear end of the carriage 16. These fittings 42, 43, may be similar to the hooked detachable connections 25, 25, so as to permit limited vertical movement of the shafts when connected to the frame, as shown in dotted lines in Figure 1. When the frames are in folded position, as shown in this figure, the ground wheels 12 and 13 which normally support the outer ends of the shafts 14 and 15 are detached therefrom and placed on the outer ends of auxiliary shafts 40 and 41. In this position it will be seen that the wheels are rotatable on parallel axes so that the entire apparatus is readily movable through relatively narrow gates or along roadways, as would be impossible with the ordinary type of double width drills, or in many instances even with a single width drill.

In the modified forms of apparatus shown in Figures 4 and 5, the frame units 10$^a$, 11$^a$ are arranged substantially at right angles to the central carriage 16, and are hinged to swing forwardly with respect thereto, instead of rearwardly, as in the case of the forms shown in Figures 1, 2 and 3. The auxiliary axles 40, 40, are mounted with their inner ends permanently connected at the hinged joints 24$^a$, 24$^a$, and the outer ends of the frames 10 and 11 may be supported by a cross member 41 at the front end of carriage 16 when said frames are in folded position, as shown in dotted lines in Figure 4. In the latter figure, the seeding mechanism is driven directly from the main axles 14$^a$ and 15$^a$, while in the modified form shown in Figure 5, the drive may be taken off the center wheel 19$^a$ through chain and sprocket connection 42$^a$.

Although I have shown certain forms and embodiments of my invention, it will be understood that I do not wish to be limited to the specific forms shown or described but that the invention may be applied to other arrangements and types of agricultural implements without departing from the spirit and scope thereof, such as defined in the appended claims.

I claim:

1. In a device of the character described, a central wheeled carriage, a pair of implement-carrying frame members normally extending at rearwardly inclined angles on opposite sides of said carriage, a pivotal connection adjacent the front end of said carriage permitting said frame to extend from one side of the said carriage in one position or swing horizontally toward the rear end of said carriage in another position, detachable connecting means between said carriage and said frame members in both of said positions, supporting axles for the outer ends of said frame members, auxiliary supporting axles on said frames detachably connectible with said carriage and adapted to extend therefrom substantially on parallel axes when said frames are in folded position, and wheels for said supporting axles.

2. In a device of the character described, a central wheeled carriage, a pair of implement-carrying frame members at opposite sides of said carriage, a pivotal connection permitting said frame to extend from one side of said carriage in one position or swing horizontally toward the same in another position, detachable connecting means for said frame members in both of said positions, supporting axles for the outer ends of said frame members, auxiliary supporting axles on said frames adapted to extend therefrom substantially on parallel axes when said frames are in folded position, and wheels for said supporting axles, the inner ends of said auxiliary axles each having supporting engagement with the central carriage when their respective frames are in folded position.

3. In a device of the class described a central wheeled carriage, a pair of implement carrying frame members normally extending at rearwardly and outwardly inclined angles on opposite sides of said carriage, a pivotal connection adjacent to the front end of said carriage, permitting each of said frame members to extend from one side of said carriage in one position or swing horizontally toward the rear end of the carriage in another position, detachable connecting means between said carriage and said frame members in both of said positions, supporting axles for the outer ends of said frame members, and wheels for supporting said axles.

Signed at Meade, Kans., this 23d day of July, 1927.

HENRY KRAUSE.